May 10, 1932. W. E. CRAWFORD 1,857,499
CONTROL FOR ELECTRICAL WELDING CURRENTS
Filed Jan. 28, 1929 2 Sheets-Sheet 1

INVENTOR.
WILLIAM E. CRAWFORD
BY
ATTORNEY.

May 10, 1932.  W. E. CRAWFORD  1,857,499
CONTROL FOR ELECTRICAL WELDING CURRENTS
Filed Jan. 28, 1929  2 Sheets-Sheet 2

INVENTOR.
WILLIAM E. CRAWFORD
BY
ATTORNEY.

Patented May 10, 1932

1,857,499

UNITED STATES PATENT OFFICE

WILLIAM E. CRAWFORD, OF WAUWATOSA, WISCONSIN, ASSIGNOR TO A. O. SMITH CORPORATION, OF MILWAUKEE, WISCONSIN, A CORPORATION OF NEW YORK

CONTROL FOR ELECTRICAL WELDING CURRENTS

Application filed January 28, 1929. Serial No. 335,700.

This invention relates to method and apparatus for controlling large amounts of electrical power where it is desirable to interrupt the power frequency as in electrical welding and heating of metals.

Where the work requires a comparatively limited amount of electrical power, an ordinary interrupting switch may be employed for controlling the power but where the work requires an extraordinary amount of power difficulties arise in controlling the same. This is particularly true where the welding or heating operation is completed in a few seconds and repeated many times an hour, as the commercial switches which have sufficient capacity to control such large currents do not have sufficient durability to withstand such repeated and frequent operation.

The object of my present invention is to overcome the above and other difficulties and to provide a simple and durable apparatus for controlling extraordinarily large amounts of electrical power.

Another object is to provide a control of this character for large welding machines.

According to my invention, the electrical power is separated into multiple circuits with the power withdrawal thereof limited by their impedance which are controlled substantially simultaneously by individual switches of ordinary capacity and a master control therefor.

I preferably employ a transformer system having multiple circuits forming separate primaries therefor and having a sufficient impedance to limit the power drawn by each primary to substantially that ordinarily employed for commercial work requiring only limited amounts of electrical power. By this arrangement, I can employ individual switches of ordinary capacity for the several parallel circuits and control these switches substantially simultaneously through a single master control.

The invention may be more readily understood by reference to the accompanying drawings in which the views are as follows.

Figure 1:
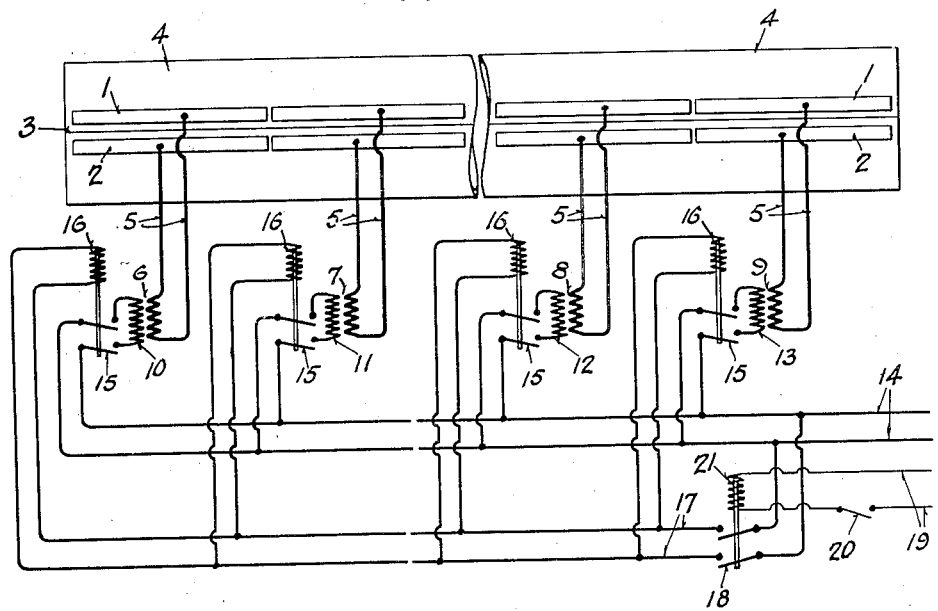
Figure 1 is a diagrammatic illustration of the circuits and control preferably employed by me in flash or resistance butt welding of longitudinal seams of long sections of pipe.
Figure 2:
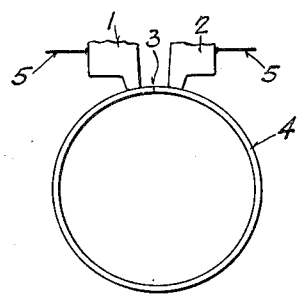
Fig. 2 is an end elevation of the pipe showing the arrangement of the electrodes thereon with respect to the seam to be welded.

I preferably employ sectional electrodes 1 and 2 extending along opposite sides of the longitudinal seam 3 in the pipe 4. The pipe may be formed from sheet metal which is converted into tubular form having a longitudinal seam to be welded, or in any other suitable manner.

The electrodes are supplied with welding current through the leads 5 which constitute the secondary or secondaries of a transformer system. I preferably provide separate pairs of leads for the separate opposed sections of the electrodes to insure a more uniform distribution of the welding current along the seam.

The transformer system is preferably made up of a plurality of separate transformers 6, 7, 8 and 9, although the system may have a single common core and a single common secondary.

The respective primaries 10, 11, 12 and 13 of the separate transformers are connected in parallel across the main supply circuit 14 which draws current from any suitable source of electrical power. The impedance to the flow of current in any given primary circuit as set up by the transformer therefor is made sufficient to limit the amount of power withdrawal in said circuit to enable the employment of an ordinary contactor switch 15 therein without danger of overload and injury to the switch. This is an important feature of the invention since it forms the basis for my novel and practical control of the welding power.

Thus, if one of the contactor switches 15 should be closed slightly earlier than the rest of the contactor switches, the current withdrawn therethrough would not be the total welding current and consequently the switch would not be injured. It is preferable, however, to have these switches operate as nearly simultaneous as possible so as to operate the welding machine as a unit and to obtain a more uniform heating of the edges to be welded throughout the length thereof.

The switches are normally held open by the action of gravity or other suitable means and I employ individual solenoids 16 to close the same. The solenoids are energized simultaneously from a master control circuit 17 which is opened and closed by a normally open master control switch 18. The circuit 17 may be a branch of the main supply circuit 14 or may be connected to any other suitable source of power and I preferably employ an auxiliary circuit 19, switch 20, and solenoid 21 to control the master switch 18 therein.

Where the apparatus is employed on a rapid production basis, I preferably employ some form of automatic control to correlate the operation of the master switch with the welding operation. Any suitable means may be employed for this purpose.

The operation of the apparatus is as follows:—When the work to be welded or heated is placed in the proper position and in contact with the electrodes 1 and 2, I close the auxiliary switch 20 in circuit 19 to energize the solenoid 21 and thereby close the master control switch 18. The closing of the master switch simultaneously energizes the solenoids 16 thereby closing the contactor switches 15 of the respective primary circuits 10, 11, 12, and 13. The welding current then flows through the main supply circuit 14, through the parallel primary circuits 10, 11, 12, and 13, and is then transformed and passed to the work through leads 5 and electrodes 1 and 2.

Since the contactor switches are normally open it is necessary to keep the solenoids 16 energized during the heating or welding operation, and when the work is suitably heated I cut off the welding current by opening the auxiliary control switch 20 to effect an opening of the master control switch 18 and de-energize the solenoids 16.

In case the time lag of the solenoids 16 should be different and one solenoid should close its contactor switch prior to the closing of its neighboring switches, the impedance of the transformer prevents an undue overloading of the switch or a burning out of the same.

The apparatus and control provided is particularly adaptable for employment in the welding of long seams since it provides a convenient means for distribution of the welding current along the seam. However, it is to be understood that the control may be applied to other purposes such as the heating of forging billets, the heating of pipes for the purpose of upsetting beads thereon, and generally for the purpose of heating metals by the resistance of the metal object to the passage of an electric current therethrough.

Figure 4:
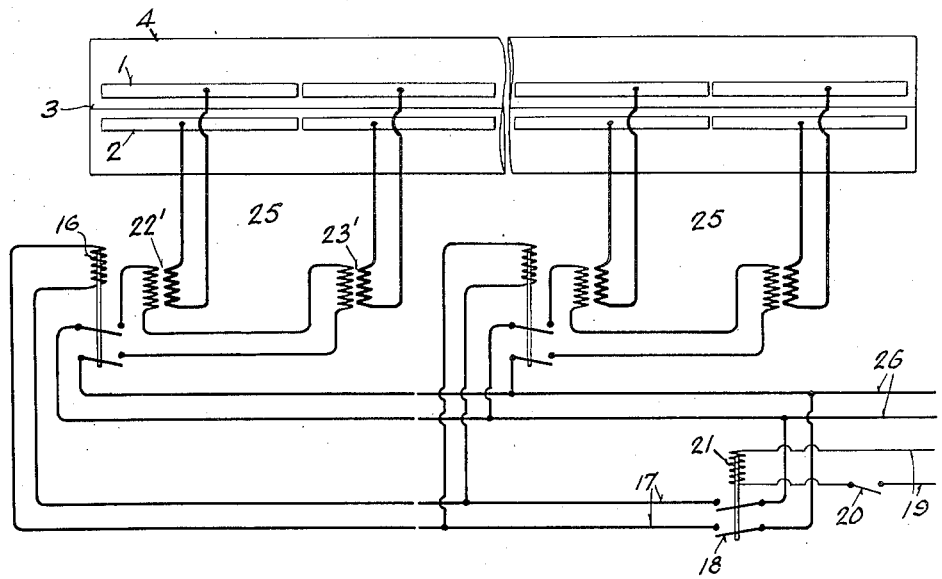
Fig. 4 illustrates another modified form of the invention.
Figure 3:
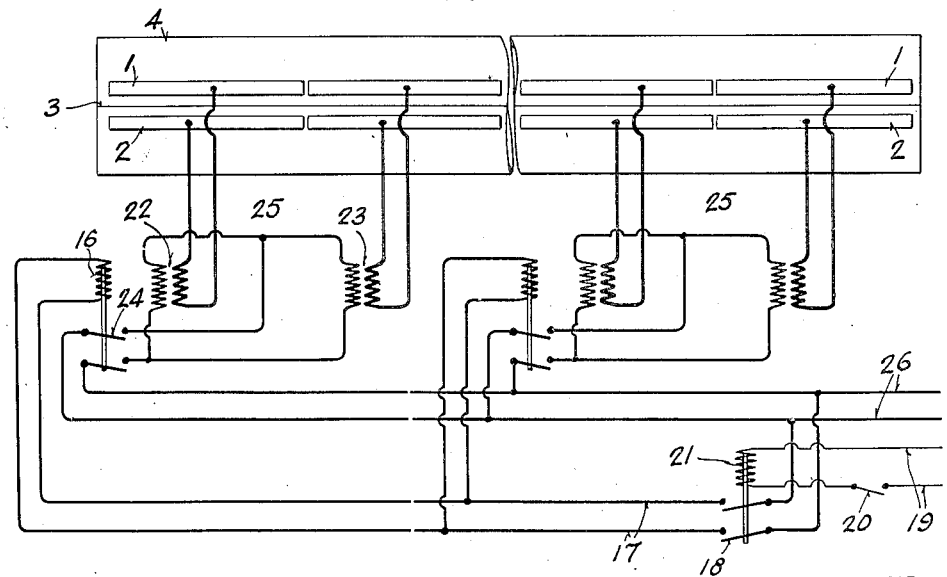
Fig. 3 illustrates a modified form of the invention.

In Fig. 3, the transformer circuits are of sufficient impedance to allow the employment of a single contactor switch for two circuits. This arrangement is particularly adaptable where a greater distribution of current is desired than is necessary to obtain the individual control provided by the invention. The transformers 22 and 23 controlled by any one contactor switch 24 are connected in parallel and the transformer units 25 which comprise the separate pairs of transformers 22 and 23 are connected in parallel to the power line 26 through the individual contactor switches 24 therefor. In Fig. 4, the transformers 22' and 23' are connected in series instead of parallel.

While I have shown four parallel primary circuits, I do not desire to limit the invention thereto as I may employ any suitable plural number of circuits. Instead of an electrical master control means I may employ a mechanical master control system to open and close the contactor switches simultaneously. Other modifications of the invention are within the scope of the claims hereof.

I claim:

1. In an electrical welding machine, an apparatus for controlling the welding current which comprises a plurality of transformers arranged in parallel and having high impedance values, means to distribute the current from said transformers to separate portions of the seam to be welded, and means for individually controlling the delivery of current through said transformers substantially simultaneously.

2. In an electric welding machine for butt welding an extended seam of substantial length, a source of electrical energy, means arranged in parallel for receiving the electrical energy and transmitting it to separate regions of the seam to be welded, and means for individually and simultaneously controlling the closing and opening of said parallel transmitting means whereby the electrical energy is applied as a unit to the seam at regions distributed therealong.

3. In a welding system, in combination, electrodes for delivering current to perform welding operations, a power source, a plurality of parallel circuits connecting the power source to the electrodes, transformers connected in the parallel circuits, switches connected in the parallel circuits for controlling the flow of current from the power source to the electrodes, and means for actuating the switches as a group to close a plurality of the parallel connected circuits substantially simultaneously, said transformers having high impedance values to limit the flow of current in the parallel circuits if one switch is closed an instant before another switch.

4. In a welding circuit, in combination, electrodes for delivering current to perform welding operations, a source of power, a plurality of transformers having primary and secondary windings, a plurality of circuits connecting the primary windings to the source of power and the secondary windings to the electrodes providing a plurality of parallel circuits for supplying current to the electrodes, a plurality of switches connected between the transformers and the source of power for controlling the flow of current to the electrodes, and common means for actuating all the switches as a group, said transformers having high impedance values for limiting the current that may flow in the parallel circuits to protect the individual switches from excessive currents if one switch is closed an instant before another switch.

5. In a welding system, in combination, a plurality of pairs of electrodes for delivering current to perform welding operations, a power source for supplying electrical current to the electrodes, transformers having primary and secondary windings disposed between the power source and the electrodes, a plurality of feed circuits connecting the primary windings to the source of power and the secondary winding to the electrode providing a plurality of parallel circuits for supplying current to the electrodes, a plurality of switches connected in the parallel circuits between the transformers and the power source, means for actuating the switches as a group to close the feed circuits substantially simultaneously, said transformers having high impedance values for limiting the flow of current to the pairs of electrodes if one switch is closed before another switch, thereby to protect the switches.

6. In a welding circuit, in combination, electrodes for delivering the current to perform welding operations, a source of power, a plurality of transformers having primary and secondary windings, a plurality of circuits connecting the primary windings to a power source and the secondary windings to the electrodes to provide a plurality of parallel feed circuits, a plurality of switches connected in the feed circuits between the transformers and the source of power for controlling the supply of current to the electrodes, and means for actuating a group of the switches to close a plurality of feed circuits, said transformers having high impedance values to limit the flow of current to the electrodes through any feed circuit when one of the switches is closed before another to protect the switches from excessive currents.

In witness whereof I have signed my name at Milwaukee, Wisconsin, this 26th day of January, 1929.

WILLIAM E. CRAWFORD.